United States Patent
Kawamura

[11] Patent Number: 6,151,768
[45] Date of Patent: Nov. 28, 2000

[54] METHOD AND APPARATUS OF MANUFACTURING A ONE-WAY CLUTCH

[75] Inventor: Katsuyuki Kawamura, Kanagawa, Japan

[73] Assignee: NSK Ltd., Tokyo, Japan

[21] Appl. No.: 09/312,851

[22] Filed: May 17, 1999

[30] Foreign Application Priority Data

May 18, 1998 [JP] Japan .................................. 10-135535

[51] Int. Cl.[7] ............................. B21D 39/03; B23P 11/00
[52] U.S. Cl. ................................. 29/430; 29/434; 29/711; 29/783; 29/785; 29/771; 29/792
[58] Field of Search ............................. 29/430, 434, 450, 29/464, 468, 711, 783, 785, 786, 771, 791, 792, 794

[56] References Cited

U.S. PATENT DOCUMENTS

| | | | |
|---|---|---|---|
| 3,061,922 | 11/1962 | Lysett | 29/464 |
| 5,636,425 | 6/1997 | Best | 29/430 |

FOREIGN PATENT DOCUMENTS 56-10494  3/1981  Japan .............................. F16C 43/06

*Primary Examiner*—David P. Bryant
*Assistant Examiner*—Jermie E. Cozart
*Attorney, Agent, or Firm*—Sughrue, Mion, Zinn, Macpeak & Seas, PLLC

[57] ABSTRACT

A predetermined number of sprags 21 are consecutively inserted into sprag pockets 45 in a boss 44 on a rotary index table by means of a sprag inserting section 50. Then, a ribbon spring 22 is fitted to the boss 44 by means of a ribbon-spring fitting section 50, and an outer retainer 23 is fitted to the boss 44 by means of an outer-retainer fitting section 70. At the same time, the boss 44 is continuously rotated to move the sprags 21 toward the radially outward side of the boss 44 by the centrifugal force acting in the sprags 21, thereby allowing the sprags 21 to be inserted and fitted into sprag inserting windows 28 and 30 of the ribbon spring 22 and the outer retainer 23. Further, an inner retainer 24 is fitted to the boss 44 by means of an inner-retainer fitting section 80 to insert and fit the sprags 21 into the sprag pockets 45 of the inner retainer 24.

2 Claims, 16 Drawing Sheets

PRIOR ART

//////

METHOD AND APPARATUS OF MANUFACTURING A ONE-WAY CLUTCH

BACKGROUND OF THE INVENTION

1. Field of the Invention

The present invention relates to a method and an apparatus of manufacturing a one-way clutch which has sprags, a ribbon spring, an inner retainer, and an outer retainer and for which an idling state and a torque transmitting state can be set in accordance with the rotational directions of an outer ring and an inner ring, and more particularly to a technique of automating the manufacture of one-way clutches.

2. Description of the Related Art

Conventionally, in the operation of assembling a one-way clutch 20 as shown in FIGS. 19A and 19B and having sprags 21, a ribbon spring 22, an outer retainer 23, and an inner retainer 24, most of the operation depends on the manual operation.

Namely, to assemble the one-way clutch 20, a predetermined number of sprags 21 are consecutively inserted and fitted into sprag inserting windows 28 provided in the ribbon spring 22 at predetermined intervals in the longitudinal direction, as shown in FIG. 20.

Next, as shown in FIG. 21, the sprags 21 are adjusted from the inner side of the outer retainer 23 to sprag inserting windows 30 provided in the outer retainer 23 at predetermined intervals along the circumferential direction of the outer retainer 23. Then, outer ring-side end portions 25 of the sprags 21 are consecutively inserted and fitted into the sprag inserting windows 30 of the outer retainer 23 in such a manner as to twist the ribbon spring 22 into which the sprags 21 have been inserted and fitted.

Further, the sprags 21 are adjusted from the outer side of the inner retainer 24 shown in FIGS. 19A and 19B to sprag inserting windows 31 provided in the inner retainer 24 at predetermined intervals along the circumferential direction of the inner retainer 24. Then, inner ring-side end portions 26 of the sprags 21 are consecutively inserted and fitted into the sprag inserting windows 31 of the inner retainer 24. These inserting operations are manually performed.

In the above-described related method, there has been a problem in that expert skill is particularly required in the operation shown in FIG. 21 in which the outer ring-side end portions 25 of the sprags 21 are inserted and fitted into the sprag inserting windows 30 of the outer retainer 23.

Namely, when the outer ring-side end portions 25 of the sprags 21 are inserted and fitted into the sprag inserting windows 30 of the outer retainer 23, it has been necessary to perform the operation by adjusting the sprags 21 from the inner side of the outer retainer 23 to the sprag inserting windows 30 of the outer retainer 23 and in such a manner as to twist the ribbon spring 22 by using of the flexibility of the ribbon spring 22. At this time, if an undue force is inadvertently applied to the ribbon spring 22, it leads to the breakage of the ribbon spring 22. Accordingly, it has been difficult to automate the operation of assembling the one-way clutches 20 through mechanization.

SUMMARY OF THE INVENTION

The present invention has been devised in view of the above-described related problem, and its object is to provide a method of manufacturing a one-way clutch which is capable of automating the operation of assembling the one-way clutch and which makes it possible to improve the productivity and stability in the quality of one-way clutches and attain labor saving.

To attain the above object, in accordance with the present invention, there is provided a method of manufacturing a one-way clutch including a plurality of sprags, a flexible ribbon spring in which sprag inserting windows for insertion of the sprags therein are formed in its longitudinal direction, an outer retainer on an inner periphery of which the ribbon spring is wound and which has sprag inserting windows into which outer peripheral-side end portions of the sprags inserted in the ribbon spring can be inserted, and an inner retainer disposed on an inner peripheral side of the ribbon spring and having sprag inserting windows into which inner peripheral-side end portions of the sprags inserted in the ribbon spring can be inserted, comprising the steps of: using a boss which is formed in a substantially hollow cylindrical shape and in which sprag pockets which are open toward a radially outward side in such a manner as to be capable of accommodating the sprags and V-shaped grooves for respectively engaging V-shaped bent portions of the ribbon spring are disposed alternately in an outer peripheral portion thereof; consecutively inserting the sprags into the sprag pockets of the boss; winding the ribbon spring around an outer periphery of the boss while the V-shaped bent portions of the ribbon spring are being respectively engaged in the V-shaped grooves of the boss; continuously rotating the boss at a predetermined number of revolutions after the outer retainer, for which a phase of the sprag inserting windows of the outer retainer is adjusted to a phase of the sprag pockets of the boss, is fitted to an outer peripheral side of the ribbon spring on the boss, thereby allowing the sprags to move from inside the sprag pockets toward the radially outward side of the boss and to be inserted and fitted into the sprag inserting windows of the ribbon spring and the outer retainer, respectively, by a centrifugal force; and fitting the inner retainer, for which a phase of the sprag inserting windows of the inner retainer is adjusted to the phase of the sprag pockets of the boss, to an inner side of the ribbon on the boss while relatively rotating the inner retainer with respect to the ribbon spring, so as to insert the sprags into the sprag inserting windows of the inner retainer.

As a result, by virtue of the centrifugal force due to the continuous operation of the boss, the sprags inserted in the sprag pockets of the boss bring about by themselves the operation of insertion and are inserted into the sprag windows of the ribbon spring and the outer retainer arranged on the outer side of the sprags with the circumferential positions of these sprag windows brought into phase relative to each other. Accordingly, by controlling the continuous operation of the boss, the insertion of the sprags is effected smoothly without applying an undue force to them.

In addition, to attain the above object, a one-way clutch manufacturing apparatus may be configured as an apparatus for manufacturing a one-way clutch including a plurality of sprags, a flexible ribbon spring in which sprag inserting windows for insertion of the sprags therein are formed in its longitudinal direction, an outer retainer on an inner periphery of which the ribbon spring is wound and which has sprag inserting windows into which outer peripheral-side end portions of the sprags inserted in the ribbon spring can be inserted, and an inner retainer disposed on an inner peripheral side of the ribbon spring and having sprag inserting windows into which inner peripheral-side end portions of the sprags inserted in the ribbon spring can be inserted, the apparatus comprising: a plurality of bosses which are each formed in a substantially hollow cylindrical shape and in which sprag pockets which are open toward a radially outward side in such a manner as to be capable of accommodating the sprags and V-shaped grooves for respectively engaging V-shaped bent portions of the ribbon spring are disposed alternately in an outer peripheral portion thereof; consecutively inserting the sprags into the sprag pockets of the boss; an index table on which the plurality of bosses are respectively placed in an outer peripheral portion of an upper portion of a table at predetermined rotational angles; sprag inserting means provided at a first position on the index table so as to consecutively insert the sprags into the sprag pockets of the boss; ribbon-spring fitting means provided at a second position adjacent to the first position on the index table so as to wind the ribbon spring around an outer periphery of the boss while the V-shaped bent portions of the ribbon spring are being respectively engaged in the V-shaped grooves of the boss; outer-retainer fitting means disposed at a third position adjacent to the second position on the index table so as to continuously rotate the boss at a predetermined number of revolutions after the outer retainer, for which a phase of the sprag inserting windows of the outer retainer is adjusted to a phase of the sprag pockets of the boss, is fitted to an outer peripheral side of the ribbon spring on the boss, thereby allowing the sprags to move from inside the sprag pockets toward the radially outward side of the boss and to be inserted and fitted into the sprag inserting windows of the ribbon spring and the outer retainer, respectively, by a centrifugal force; and inner-retainer fitting means disposed at a fourth position adjacent to the third position on the index table so as to fit the inner retainer, for which a phase of the sprag inserting windows of the inner retainer is adjusted to the phase of the sprag pockets of the boss, to an inner side of the ribbon on the boss while relatively rotating the inner retainer with respect to the ribbon spring, so as to insert the sprags into the sprag inserting windows of the inner retainer.

DETAILED DESCRIPTION OF THE PREFERRED EMBODIMENT

Figure 1:
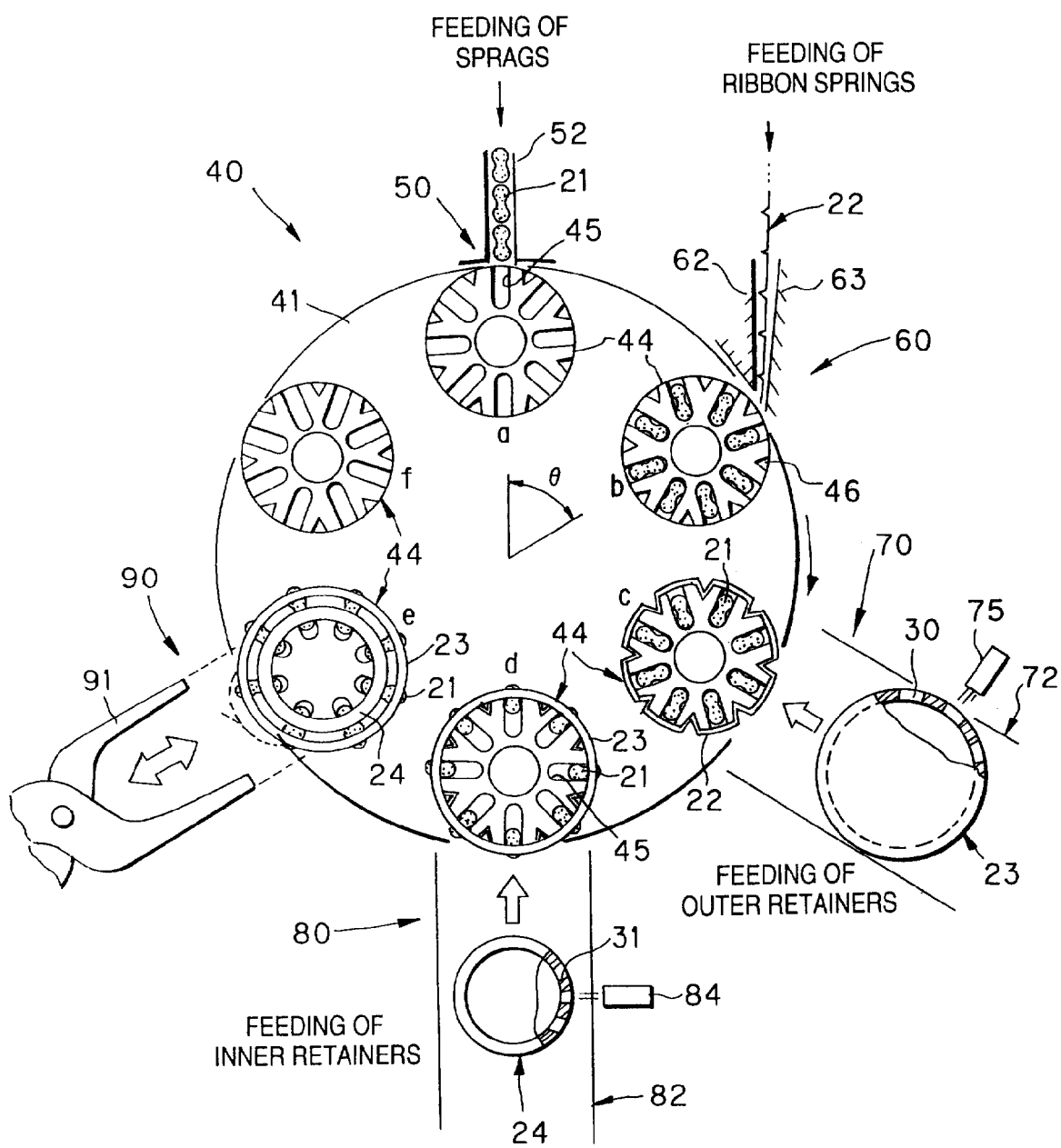
FIG. 1 is a schematic plan view illustrating a one-way clutch manufacturing apparatus to which the method of manufacturing a one-way clutch in accordance with an embodiment of the present invention is applied.

Referring now to FIGS. 1 to 19, a description will be given of an embodiment of the method of manufacturing a one-way clutch in accordance with the present invention.

First, referring to FIGS. 19A and 19B, a description will be given of the configuration of a one-way clutch 20.

The one-way clutch 20 includes a predetermined number of sprags 21, a ribbon spring 22, an outer retainer 23, and an inner retainer 24. In the one-way clutch 20, the sprags 21 are interposed between an outer ring 10 and an inner ring 11, and displacement (rotational displacement) of the sprags 21 along the rotational directions of the outer and inner rings 10 and 11 is caused to occur in correspondence with the rotational directions thereof and difference in rotation of thereof. Therefore, torque corresponding to that difference in rotation is transmitted only during the rotation of the outer and inner rings 10 and 11 in predetermined directions.

Figure 19A:
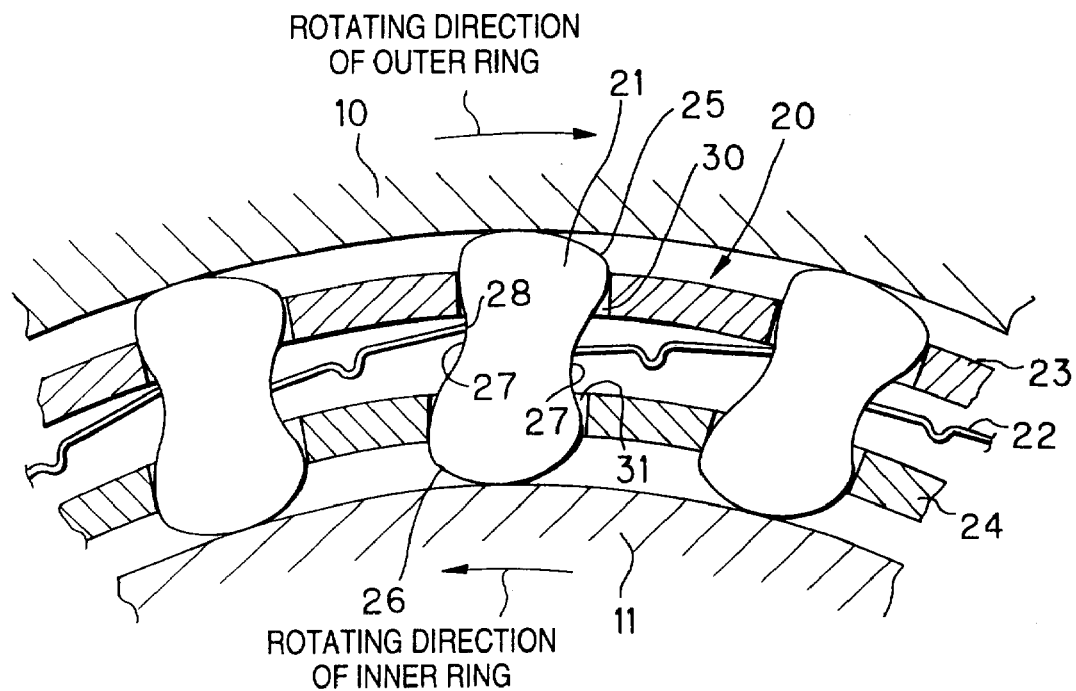
FIGS. 19A and 19B are cross-sectional views of essential portions illustrating an idling state and a torque transmitting state in which the one-way clutch is clamped between an outer ring and an inner ring.

Specifically, as shown in FIG. 19A, when the outer ring 10 rotates clockwise and the inner ring 11 rotates counterclockwise, the sprags 21 slide between the outer ring 10 and the inner ring 11, and allow the respective rotation of the outer ring 10 and the inner ring 11. Namely, the one-way clutch 20 is set in an idling state.

Figure 19B:
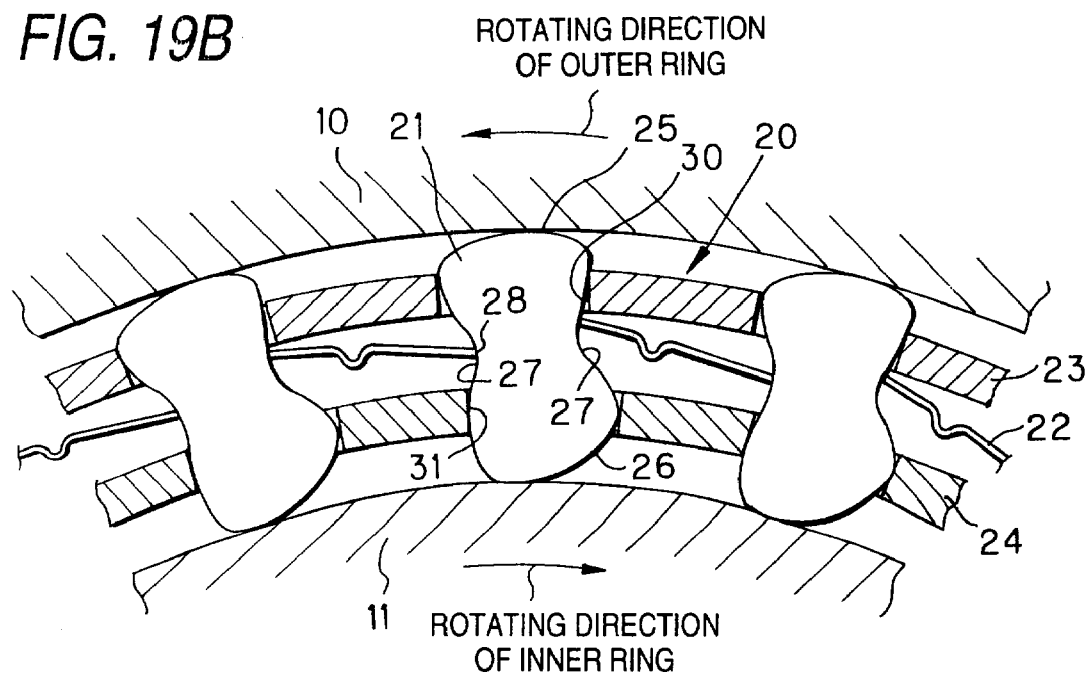
Figure 20:
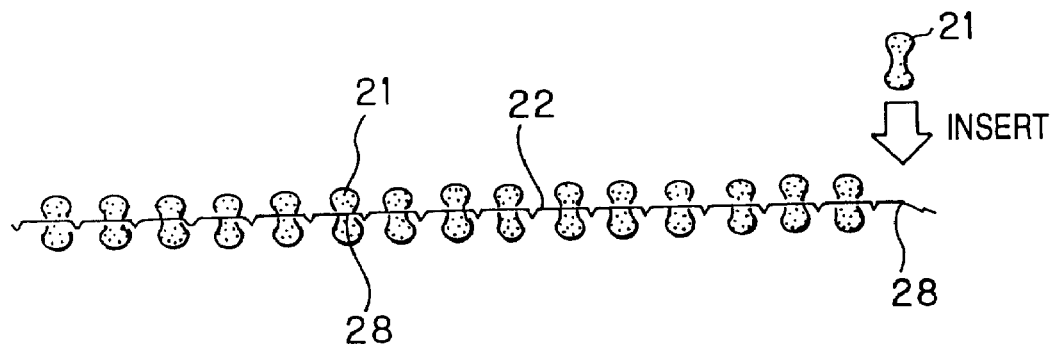
FIG. 20 is a side view for describing a related method of inserting and fitting the sprags into the sprag inserting windows of the ribbon spring.
Figure 21:
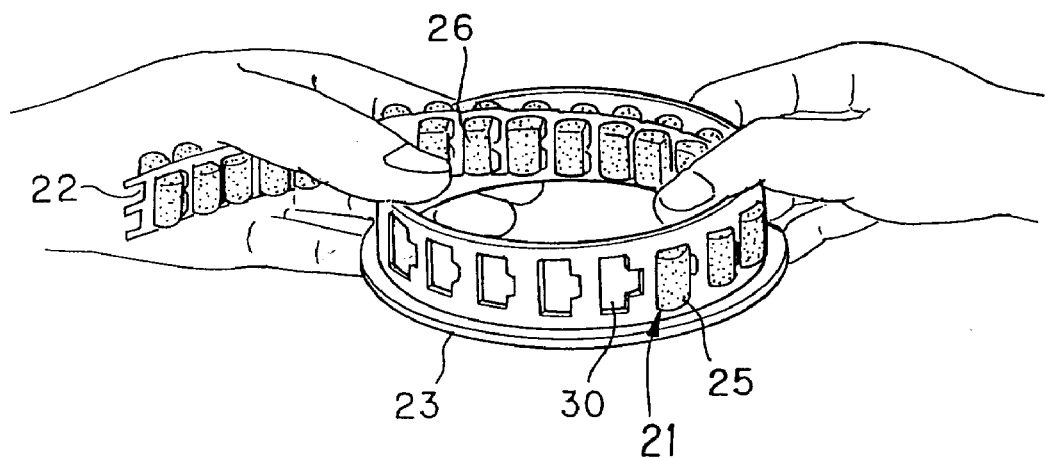
FIG. 21 is a perspective view for explaining a related method in which the sprags inserted and fitted in the sprag inserting windows of the ribbon spring are manually inserted and fitted in the sprag inserting windows of the outer retainer.

Meanwhile, as shown in FIG. 19B, when the outer ring 10 rotates counterclockwise and the inner ring 11 rotates clockwise, as the sprags 21 in terms of their attitude are displaced counterclockwise, the sprags 21 are set in a state of being bitten between the outer ring 10 and the inner ring 11. Consequently, the one-way clutch 20 is set in a state of being locked between the outer ring 10 and the inner ring 11, thereby transmitting the torque of the outer ring 10 to the inner ring 11 or transmitting the torque of the inner ring 11 to the outer ring 10.

Each sprag 21 has a gourd-shaped outer configuration such as the one shown in FIGS. 19A and 19B, and in the state in which the sprags 21 are built in between the outer ring 10 and the inner ring 11, an outer ring-side end portion 25 abuts against the outer ring 10, and an inner ring-side end portion 26 abuts against the inner ring 11. In the attitude in which each sprag 21 has undergone a rotational displacement in the clockwise direction shown in FIG. 19A, each sprag 21 slides between the outer ring 10 and the inner ring 11.

Sprag inserting windows 28 provided in a number identical to the number of sprags are formed in the ribbon spring 22 at predetermined intervals in its longitudinal direction, and the sprags 21 are respectively inserted in the sprag inserting windows 28. A pair of recessed portions 27 are respectively formed on both sides of each sprag 21 at substantially intermediate portions thereof between the outer ring-side end portion 25 and the inner ring-side end portion 26. The pair of recessed portions 27 are respectively clamped in the ribbon spring 22 by means of an edge of each sprag inserting window 28 and a tab 29 (see FIG. 11) provided in each sprag inserting window 28. For this reason, the ribbon spring 22 causes the sprags 21 to be constantly urged in a rotationally displaced attitude in a direction which allows the outer ring 10 and the inner ring 11 to mesh with each other, i.e., counterclockwise as shown in FIG. 19B.

As a result, the backlash at the time when the one-way clutch 20 shifts from the idling state to the meshed state can be reduced as practically as possible.

The outer retainer 23 is formed in a substantially hollow cylindrical shape, and sprag inserting windows 30 provided in a number identical to the number of sprags 21 are formed in a peripheral surface of the outer retainer 23 at predetermined intervals in its circumferential direction. The outer ring-side end portions 25 of the sprags 21 are respectively inserted in the sprag inserting windows 30 of the outer retainer 23.

The inner retainer 24 is formed in a substantially hollow cylindrical shape with a diameter smaller than the diameter of the outer retainer 23. Sprag inserting windows 31 provided in a number identical to the number of sprags 21 are formed in a peripheral surface of the inner retainer 24 at predetermined intervals in its circumferential direction. The inner ring-side end portions 26 of the sprags 21 are respectively inserted in the sprag inserting windows 31 of the inner retainer 24.

A description will be given of a one-way clutch manufacturing apparatus 40 for manufacturing the above-described one-way clutch 20 as well as a method of manufacturing the one-way clutch 20 using the apparatus 40.

As schematically shown in FIG. 1, in the one-way clutch manufacturing apparatus 40, a plurality of bosses 44 are respectively disposed at positions a, b, c, d, e, and f of respective processes on a rotary index table 41 which is rotatable. Particularly at the positions a, b, c, and d, servo motors for rotatively driving the bosses 44 are respectively disposed on the lower surface side of the index table 41.

The rotary index table 41 is formed substantially in a disk shape and is rotated through each predetermined angle θ (θ is 60° in FIG. 1) by being driven by a servo motor 43 (see FIG. 5) which is controlled by a controller 42.

The bosses 44 are provided in a predetermined number (six pieces at equal intervals in FIG. 1) at predetermined intervals in the circumferential direction in an outer peripheral portion on the upper surface of the rotary index table 41, and particular bosses 44 are provided in such a manner as to be rotatable in their respective positions. The bosses 44 are formed in identical, substantially hollow cylindrical shapes, and have outer diameters which take into consideration the diameters of the outer retainer 23 and the inner retainer 24 as well as the longitudinal dimension of the ribbon spring 22.

In the outer peripheral surface of each boss 44, there are provided with sprag pockets 45 in a predetermined number (only eight are shown in FIG. 1 for the sake of simplicity) for allowing the sprags 21 to be accommodated, and V-grooves 46 into which wrinkles 22a (see FIG. 6), i.e., V-shaped bent portions of the ribbon spring 22, can be fitted. The sprag pockets 45 and V-grooves 46 are formed alternately at predetermined intervals along the circumferential direction on the outer peripheral surface of each boss 44, and are open radially toward the outer side of the boss 44.

It should be noted that each operation of the above-described one-way clutch manufacturing apparatus 40 is controlled by the controller 42.

According to the above-described one-way clutch manufacturing apparatus 40, the assembling process is commenced at the position a, and after consecutively undergoing the respective steps at the positions b, c, and d and upon finally arriving at the position e, the process of assembling one one-way clutch is completed.

Hereafter, a description will be given by referring to the respective steps at these positions a, b, c, d, and e as a first step, a second step, a third step, a fourth step, and a fifth step.

Outlines of the details of the aforementioned steps are described below.

Figure 2:
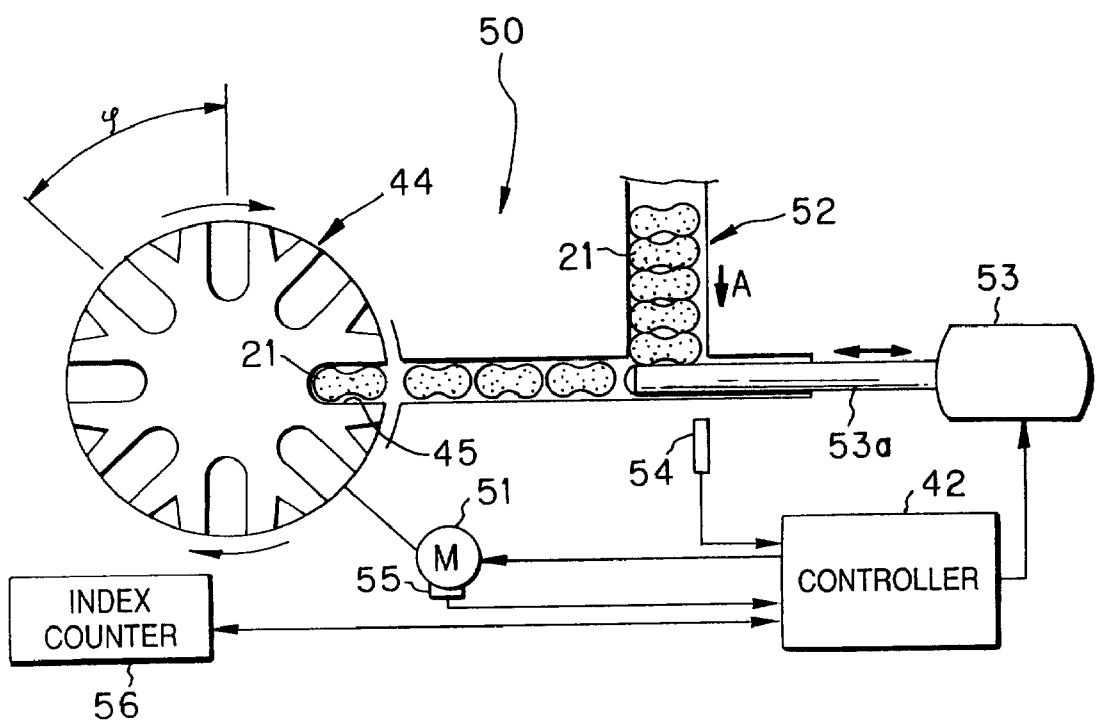
FIG. 2 is a schematic plan view illustrating a state at the time of starting the insertion of sprags in a sprag inserting section of the one-way clutch manufacturing apparatus shown in FIG. 1.

In the first step, as shown in FIG. 2, a predetermined number of sprags 21 are consecutively inserted into the sprag pockets 45 formed in the boss 44 at a sprag inserting section 50 being the position a on the rotary index table 41.

Figure 6:
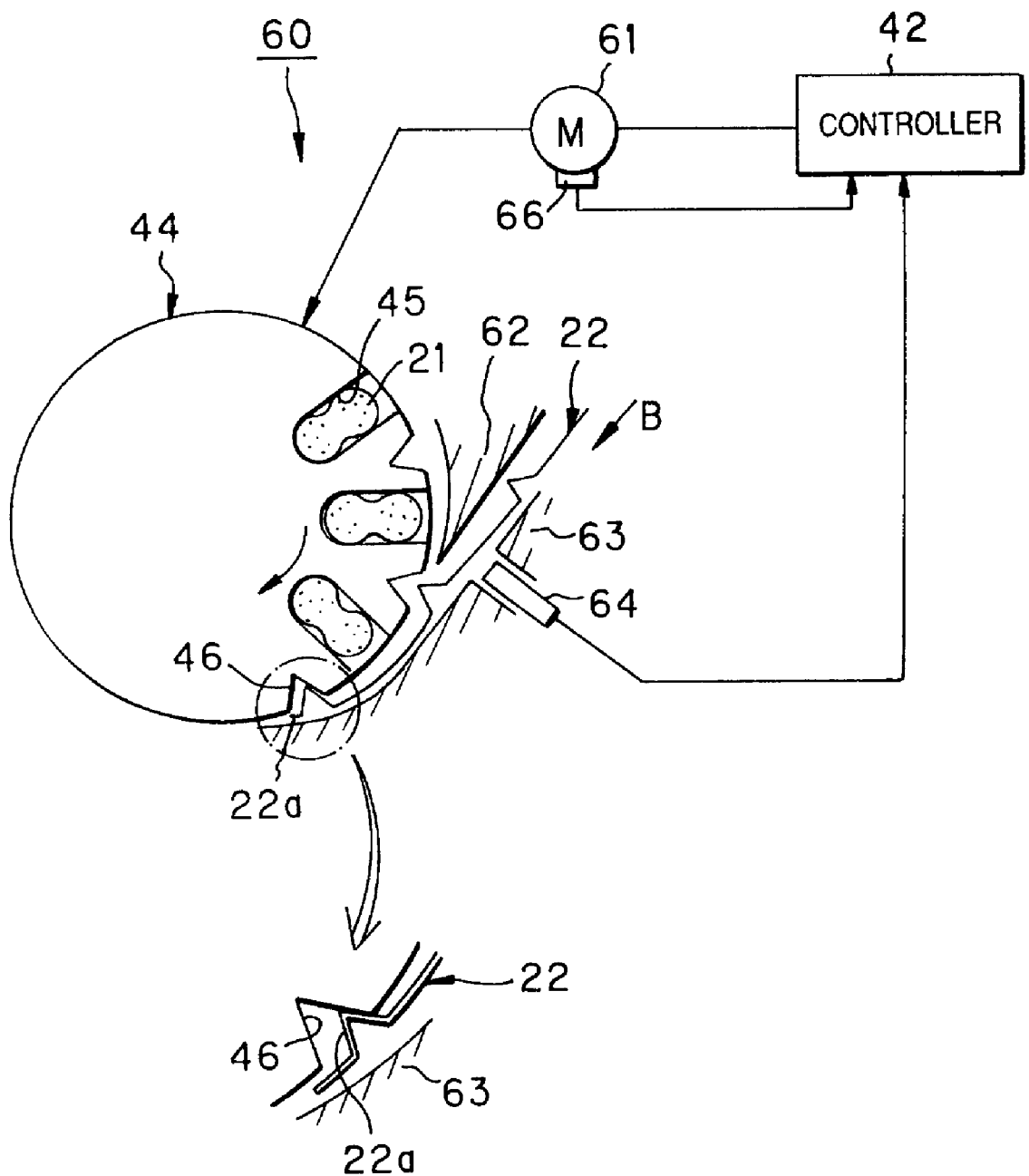
FIG. 6 is a schematic plan view illustrating a ribbon-spring fitting section of the one-way clutch manufacturing apparatus.

In the second step, as shown in FIG. 6, the ribbon spring 22 is wound around the outer periphery of the boss 44 at a ribbon-spring fitting section 60.

In the third step, as shown in FIG. 1, at an outer-retaining fitting section 70, the outer retainer 23 is fitted to the outer side of the ribbon spring 22 wound around the boss 44, and the boss 44 is rotated continuously at a high speed. In conjunction with the high-speed rotation of the boss 44 at this time, a centrifugal force acts in the sprags 21, and the sprags 21 move toward the radially outer side of the boss 44 from within the sprag pockets 45. The sprags 21 are thus inserted and fitted in the sprag inserting windows 28 (see FIG. 11) of the ribbon spring 22 and the sprag inserting windows 30 of the outer retainer 23, respectively.

In the fourth step, as shown in FIG. 1, at an inner-retainer fitting section 80, the inner retainer 24 is fitted to the inner side of the ribbon spring 22 wound around the boss 44, while being rotated relative to the outer retainer 23 and the ribbon spring 22, thereby allowing the sprags 21 in the ribbon spring 22 to be inserted and fitted in the sprag inserting windows 31 of the inner retainer 24.

In the fifth step, as shown in FIG. 1, at an unloader section 90, the assembled one-way clutch 20 is removed from the boss 44 and is carried out.

Described above are the outlines of the details of the respective steps. Next, the details of the respective steps will be described in order.

First, a description will be given of the first step with reference to FIGS. 1 to 5.

The sprag inserting section 50 is provided at one position on the outer peripheral portion of the rotary index table 41 shown in FIG. 1. This sprag inserting section 50 consecutively inserts the sprags 21 into the sprag pockets 45 formed in the boss 44 by intermittently rotating the boss 44.

Specifically, as shown in FIG. 2, the sprag inserting section 50 includes a boss 44, a servo motor 51 for rotatively driving the boss 44, a sprag arraying device 52 for arraying and consecutively feeding the sprags 21, and a pusher 53 having a pusher bar 53a for inserting the sprags 21 from the sprag arraying device 52 into the respective sprag pockets 45. The sprag inserting section 50 further includes a pusher position sensor 54 constituted by such as a photocoupler, for detecting a change in the position of the pusher 53 accompanying the advance and retraction of the pusher 53, an encoder 55 for detecting the rotation of the servo motor 51, and an index counter 56 for counting the index position of the boss 44. Outputs from the pusher position sensor 54, the encoder 55, and the index counter 56 are inputted to the controller 42.

The sprag inserting section 50 having the above-described structure operates as follows. Namely, by means of the servo motor 51, the controller 42 intermittently rotates the boss 44 through each predetermined angle φ corresponding to the angle between adjacent ones of the sprag pockets 45. In addition, the controller 42 causes the sprags 21 arrayed in a row and urged in a feeding direction A by the sprag arraying device 52 to be pushed out one by one starting with the foremost one in the row by the reciprocating motion of the pusher bar 53a, thereby allowing the sprags 21 to be consecutively inserted into the sprag pockets 45 of the boss 44. Upon completion of the insertion, the controller 42 instructs the pusher 53 to retract the pusher bar 53a to a rightmost position which is an initial position.

At this time, as shown in FIG. 2, inputted to the controller 42 are a pusher position signal from the pusher position sensor 54 accompanying the reciprocating motion of the pusher 53a, a motor rotation signal representative of the rotation of the servo motor 51, and an index signal representative of the index position of the boss 44.

Upon receiving these signals, the controller 42 first detects the present index position of the boss 44 on the basis of the index signal, and then determines by means of a differential counter 57 whether or not the motor rotation signal represents the rotation through the predetermined angle φ for indexing. If it is determined that the boss 44 has rotated through the predetermined angle φ, the pusher 53 is actuated to advance the pusher bar 53a, thereby inserting one sprag 21 into the sprag pocket 45. At the same time, an index counter 56 is incremented by 1 from the present count. The operation of the pusher 53 at this time is effected while the position of the bar 53a is being detected by the pusher position sensor 54.

Meanwhile, before the predetermined angle φ for indexing is reached, the controller 42 sends a rotation command to the servo motor 51 so as to rotate the boss 44 up to the predetermined angle.

Thereafter, the controller 42 repeats the above-described operation. In the meantime, the controller 42 determines whether or not the sprags 21 have been inserted in all the sprag pockets 45 of the boss 44. This determination is made on the basis of the count value of the index counter 56 and the motor rotation signal. If it is determined that all the sprags 21 have been inserted, the rotary index stable 41 is turned through the predetermined angle θ, and the boss 44 with the sprags 21 inserted into all the sprag pockets 45 at the sprag inserting section 50 is moved to the ribbon-spring fitting section 60.

Figure 4:
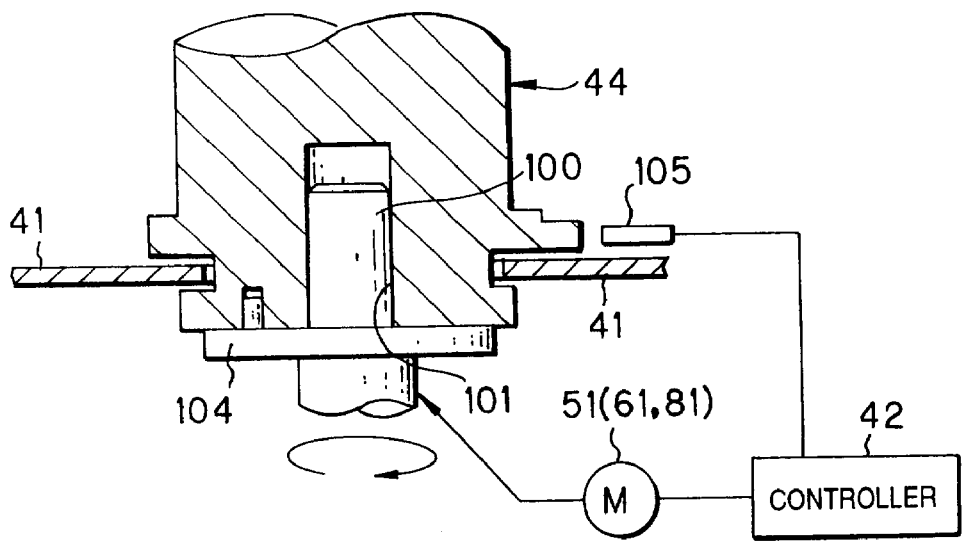
FIG. 4 is a cross-sectional view illustrating the states of a rotary index table, a boss, and a servo motor shaft during the rotation of the boss in the one-way clutch manufacturing apparatus shown in FIG. 1.

In the above-described operation, when the boss 44 rotates through the predetermined angle φ, the rotary index table 41, the boss 44, and a servo motor shaft 100 are in the states shown in FIG. 4.

In FIG. 4, the servo motor shaft 100 is fitted in a servo-motor-shaft fitting hole 101 provided in the boss 44. With this fitting, the boss 44 is a state in which it is lifted up by a predetermined amount by the servo motor shaft 100 and a plate 104 fixed to the servo motor shaft 100, and is hence spaced apart from the rotary index table 41. In this state, on the basis of a signal from a boss-rotation-position detecting sensor 105, the controller 42 controls the servo motor 51 (the same holds true of servo motors 61, 71, and 81 which will be described later), and rotates the boss 44 through the predetermined angle φ.

As a result, the boss 44 is rotated through each angle at which the position of the opening of the sprag pocket 45 coincides with a sprag outlet portion of the sprag-arraying device.

Figure 5:
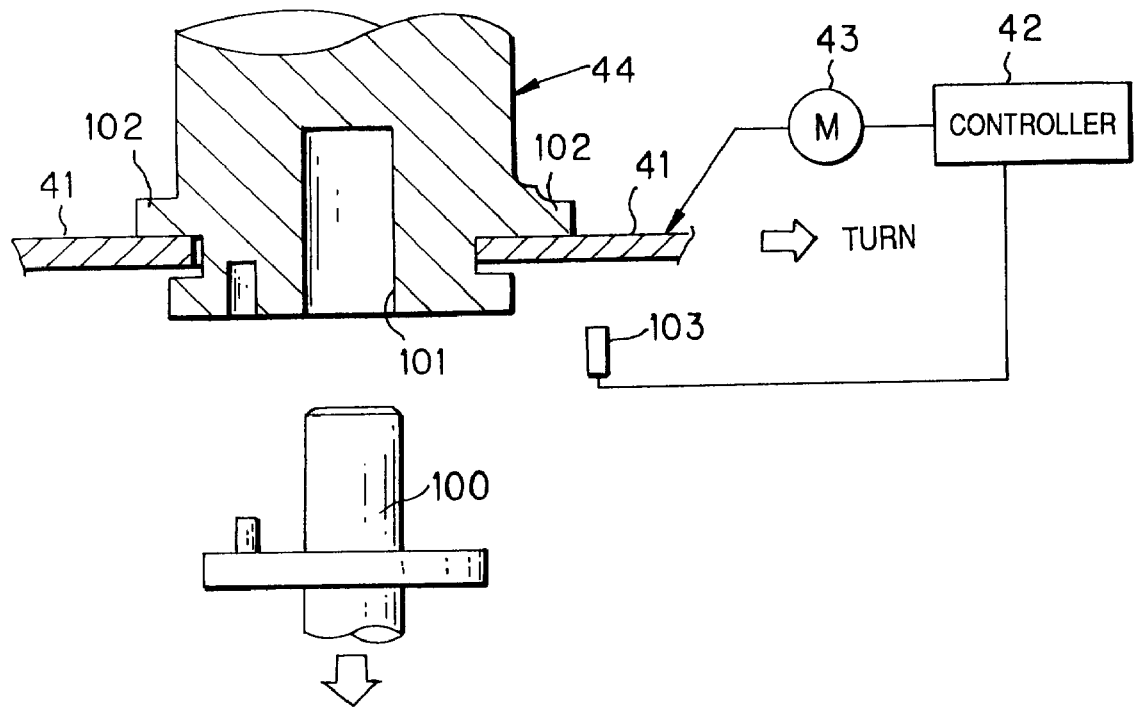
FIG. 5 is a cross-sectional view illustrating the states of the rotary index table, the boss, and the servo motor shaft during the rotation of the rotary index table in the one-way clutch manufacturing apparatus shown in FIG. 1.

In addition, when the rotary index table 41 is turned through the predetermined angle θ after completion of insertion of all the sprags, the rotary index table 41, the boss 44, and the servo motor shaft 100 are in the states shown in FIG. 5.

Namely, in FIG. 5, the servo motor shaft 100 is at a position in which it is removed from the servo-motor-shaft fitting hole 101 formed in the lower surface of the boss 44, and the boss 44 is in a state of being placed on the upper surface of the rotary index table 41 via a flange 102 which projects radially from the boss 44. In this state, on the basis of a signal from a sensor 103 for detecting the rotational position of a rotary index table 41, the controller 42 controls the servo motor 43 of the rotary index table 41 to rotate the rotary index table 41 through the predetermined angle θ.

Through the above-described first step, at the sprag inserting section 50, the sprags 21 are consecutively inserted into the respective sprag pockets 45 which are open radially toward the outer side in the outer peripheral surface of the boss 44 at the position a on the rotary index table 41. This step is a sprag insertion step.

Figure 3:
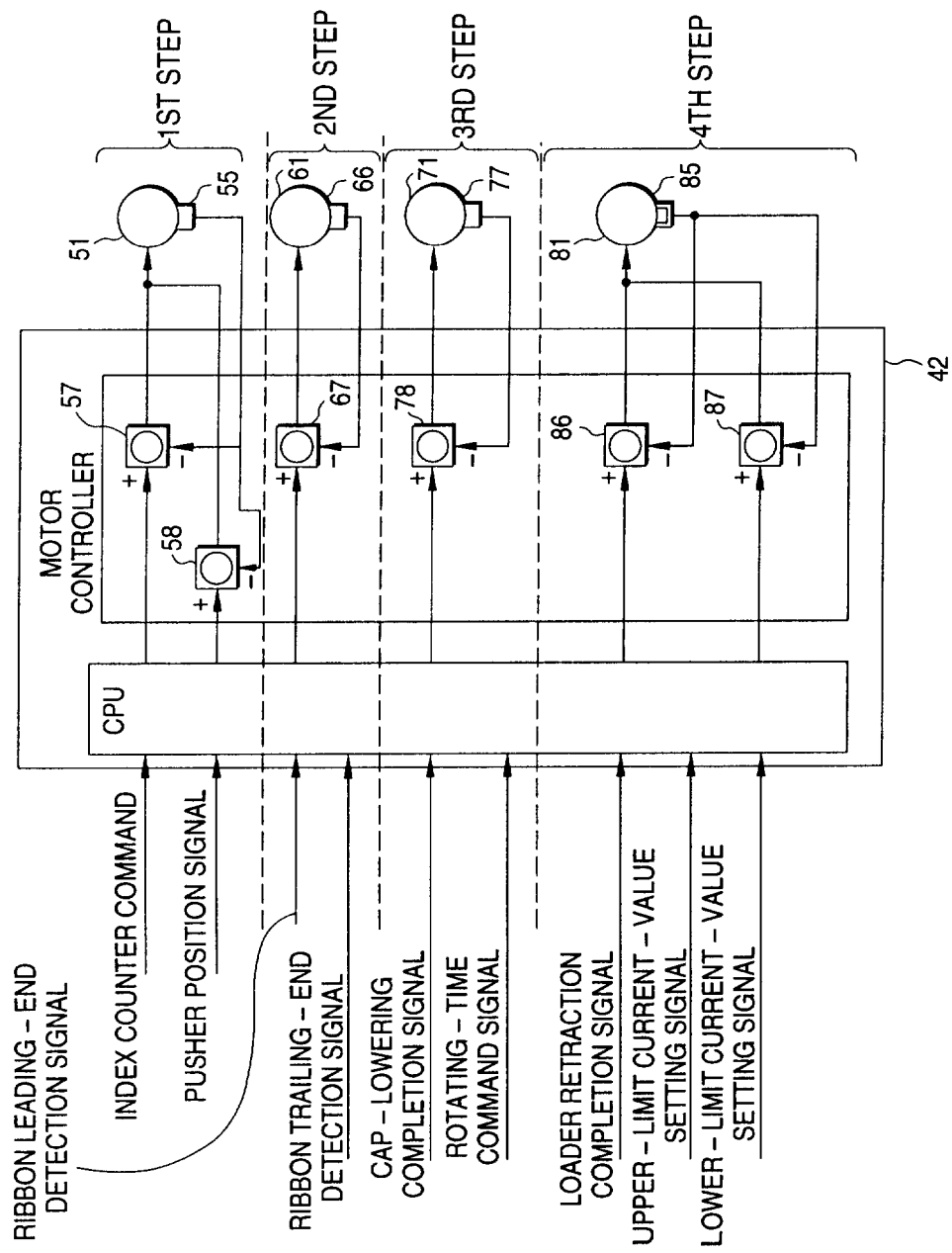
FIG. 3 is a diagram illustrating the configuration of a controller of the one-way clutch manufacturing apparatus shown in FIG. 1.

Next, referring to FIGS. 1, 3, and 6, a description will be given of the second step.

The ribbon-spring fitting section 60 is provided at one position on the outer peripheral portion of the rotary index table 41, the position being at the predetermined angle θ from the sprag inserting section 50 of the first step (in FIG. 1 at the position in which the ribbon-spring fitting section 60 is rotated 60° clockwise from the sprag inserting section 50). As the boss 44 is rotated by the servo motor 61, this ribbon-spring fitting section 60 winds the ribbon spring 22 around the outer periphery of the boss 44 while causing the wrinkles 22*a*, i.e., V-shaped bent portions of the ribbon spring 22, to engage the V-shaped grooves 46 in the boss 44.

Specifically, as shown in FIG. 6, the ribbon-spring fitting section 60 includes the boss 44, the servo motor 61 for rotatively driving the boss 44, and an inner guide 62 and an outer guide 63 for guiding the ribbon spring 22 diagonally downward in the drawing. The inner guide 62 and the outer guide 63 respectively guide the ribbon spring 22, which is fed from the upward direction in the drawing, in the direction B, and lead the ribbon spring 22 to the lower side of the boss 44 in the drawing along the rotating direction (clockwise direction) of the boss 44. Namely, the outer guide 63 guides the ribbon spring 22 in such a manner as to cause the ribbon spring 22 to approach the outer peripheral surface of the boss 44, and causes the wrinkle 22*a* at the tip of the ribbon spring 22 to engage in the V-shaped groove 46 in the boss 44. This engagement is effected naturally by rotating the boss 44 as the interval between the outer guide 63 and the outer peripheral surface of the boss 44 is gradually narrowed in the feeding direction B.

Further, the outer guide 63 is provided with a ribbon-spring detection sensor 64. The ribbon-spring detection sensor 64 detects a leading end and a trailing end of the ribbon spring 22, and outputs a ribbon-spring leading-end detection signal or a ribbon-spring trailing-end detection signal to the controller 42.

When the ribbon-spring leading-end detection signal is inputted to the controller 42 from the ribbon-spring detection sensor 64, the controller 42 starts the rotation of the boss 44 by the servo motor 61. As the boss 44 rotates, the wrinkle 22*a* at the leading end of the ribbon spring 22 abutting against the outer peripheral surface of the boss 44 engages in the V-shaped groove 46 after sliding on the outer peripheral surface of the boss 44 (or directly without sliding). Subsequently, the ribbon spring 22 is drawn in the rotating direction of the boss 44 in such a manner as to be wound around the outer periphery of the boss 44 in conjunction with the rotation of the boss 44, and the following wrinkles 22*a* of the ribbon spring 22 are consecutively engaged in the V-shaped grooves 46 of the boss 44. The ribbon spring 22 which is thus wound around the outer periphery of the boss 44 is loosely inserted in a ribbon-spring guide groove 65 formed at an upper edge portion of the boss 44 shown in FIG. 7B. As a result, the ribbon spring 22 is restricted to expand toward the radially outward side of the boss 44.

When the ribbon-spring trailing-end detection signal is inputted to the controller 42 from the ribbon-spring detection sensor 64, the controller 42 stops the rotation of the boss 44 by the servo motor 61. The rotation of the boss 44 is controlled by an encoder 66 for detecting the rotation of the servo motor 61 and a differential counter 67, as shown in FIG. 3.

Subsequently, the controller 42 causes the rotary index table 41 to turn through the predetermined angle θ, so that the boss 44, into which all the sprags 21 have been inserted by the sprag inserting section 50, and around the outer periphery of which the ribbon spring 22 has been wound by the ribbon-spring fitting section 60, is moved to the position of the outer-retainer fitting section 70.

Through the above-described second step, by the ribbon-spring fitting section 60, the ribbon spring 22 is wound around the outer periphery of the boss 44, which has been sent to the position of the ribbon-spring fitting section 60 by turning the rotary index table 41, while the wrinkles 22*a* of the ribbon spring 22 are being engaged in the V-shaped grooves 46 on the outer peripheral surface of the boss 44. This step is a ribbon-spring fitting step.

Next, referring to FIGS. 1, 3, and 7A to 10B, a description will be given of the third step.

The outer-retainer fitting section 70 is provided at one position on the outer peripheral portion of the rotary index table 41, the position being at the predetermined angle θ from the ribbon-spring fitting section 60 of the second step (in FIG. 1 at the position in which the outer-retainer fitting section 70 is rotated 60° clockwise from the ribbon-spring fitting section 60).

Figure 7A:
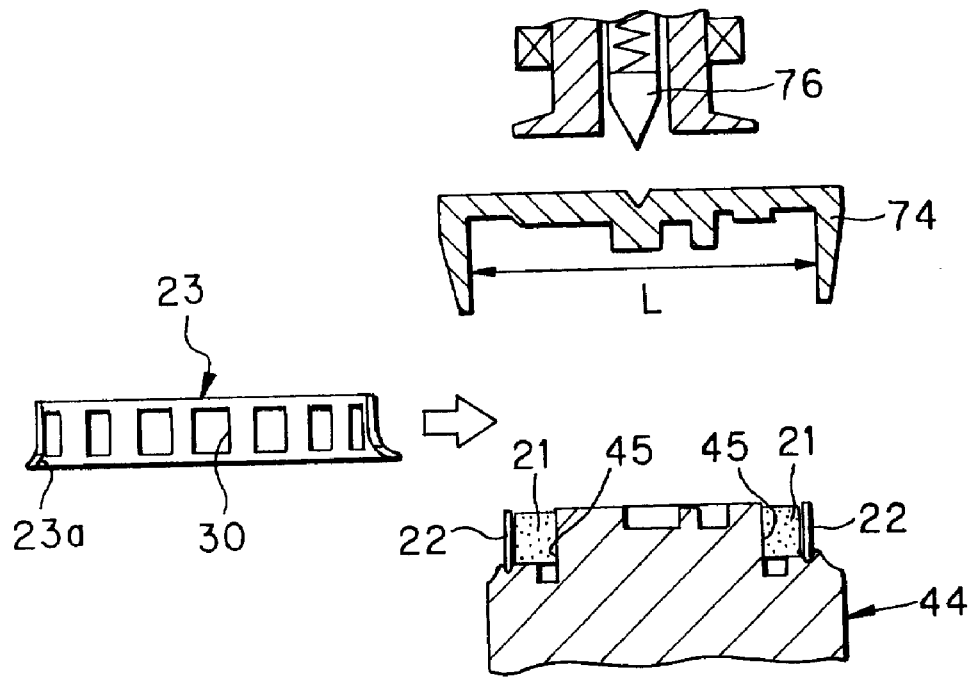
FIGS. 7A and 7B are cross-sectional views of essential portions of an outer-retainer fitting section of the one-way clutch manufacturing apparatus.

The outer-retainer fitting section 70 includes the boss 44, the servo motor 71 for rotatively driving the boss 44, an outer retainer magazine 72 for supplying outer retainers, an outer retainer loader (not shown) for moving the outer retainer 23 to the position of the boss 44, a cap 74 for covering the upper surface of the boss 44 and a rotation center 76, both shown in FIG. 7A, and a sprag-window detecting sensor 75 for detecting the sprag inserting window of the outer retainer 23 in the outer retainer magazine 72.

The outer-retainer fitting section 70 adjusts the angle of placement of the outer retainer 23 supplied from the outer retainer magazine (not shown), such that the circumferential position of the sprag inserting windows 30 in the outer retainer 23 will be in phase with the circumferential position of the sprag pockets 45 in the boss 44. This adjustment is made so that the phases agree with each other when the outer retainer 23 is moved to the position of the boss 44.

Figure 8A:
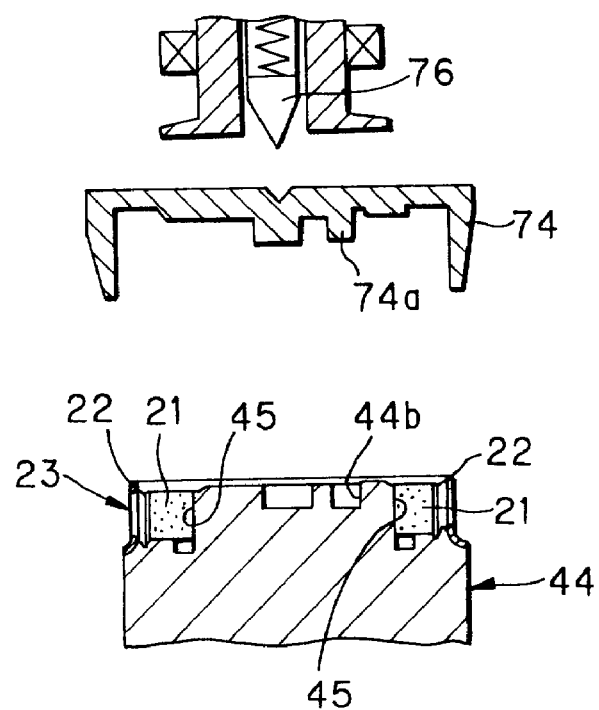
FIGS. 8A and 8B are cross-sectional views of essential portions of the outer-retainer fitting section of the one-way clutch manufacturing apparatus in which an outer retainer has been fitted.
Figure 8B:
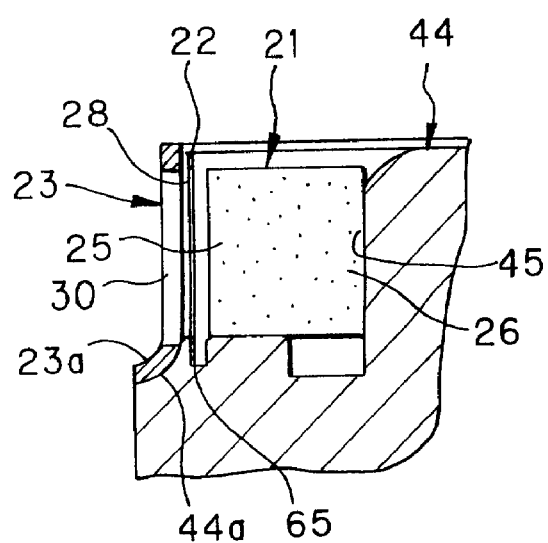

Then, as shown in FIG. 7A, the outer retainer loader grabs the outer retainer 23 and moves the outer retainer 23 in this state to immediately above the center position of the boss 44. Then, as shown in FIGS. 8A and 8B, the outer retainer 23 is placed on the outer side of the ribbon spring 22 in the upper portion of the boss 44.

More specifically, as for each of the outer retainers 23, which are supplied one by one to a transport passage from the outer retainer magazine 72 accommodating the outer retainers 23, the angle of its placement is adjusted on the basis of a signal from the sprag-window detecting sensor 75 (a reflection-type projection-reception sensor) such that the circumferential position of the sprag inserting windows 30 will be in phase with the circumferential position of the sprag pockets 45 in the boss 44.

Figure 7B:
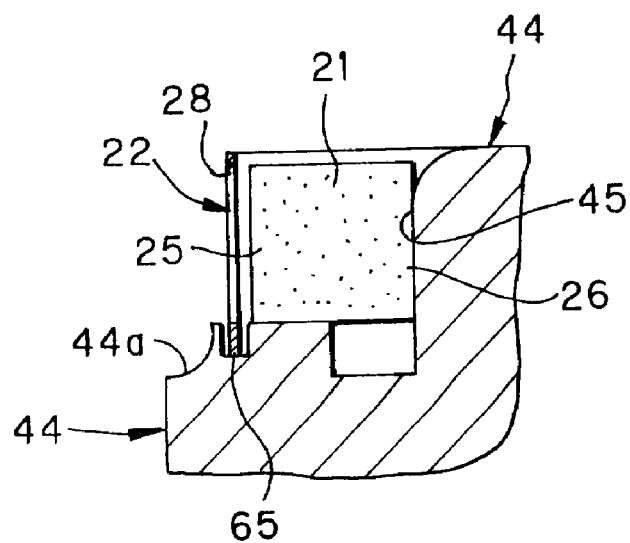

Next, the outer retainer loader grabs the outer retainer 23 from the outer retainer magazine 72 and advances it toward the rotary index table 41 side until the center of the outer retainer 23 is aligned with the center of the boss 44. The outer retainer loader then places the outer retainer 23 on the outer side of the ribbon spring 22 in the upper portion of the boss 44 from above. As shown in FIG. 7A and in FIG. 7B illustrating in detail essential portions of the boss 44 shown in FIG. 7A, the position of the outer retainer 23 at this time is restricted as an outer-retainer curved surface 23*a* formed on a lower end of the outer retainer 23 slides on an outer-retainer guiding curved surface 44*a* formed on the outer periphery of an upper portion of the boss 44 while abutting against the outer-retainer guiding curved surface 44*a*. Consequently, if the outer retainer 23 is merely allowed to fall as shown in FIGS. 8A and 8B, the outer retainer 23 is automatically positioned to the position where its center is aligned with the center of the boss 44. Subsequently, after fitting the outer retainer 23 on the boss 44, the outer retainer loader retracts to its initial position.

Figure 9A:
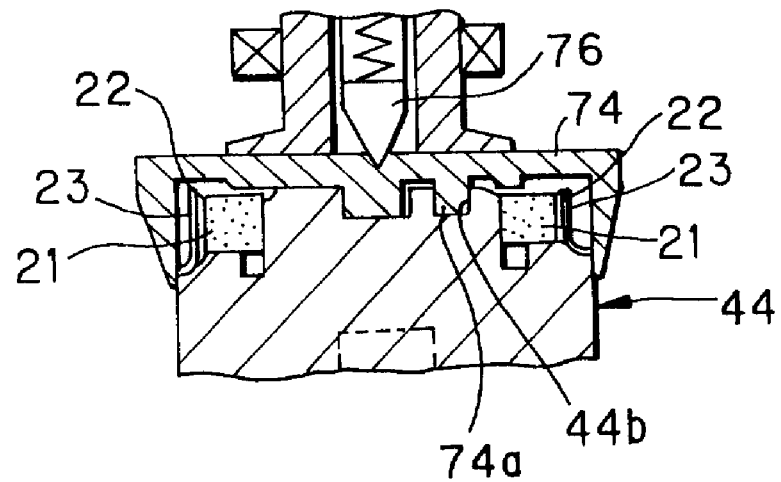
FIGS. 9A and 9B are cross-sectional views of essential portions of the outer-retainer fitting section of the one-way clutch manufacturing apparatus in which a cap has been fitted over an upper surface of the boss.
Figure 9B:
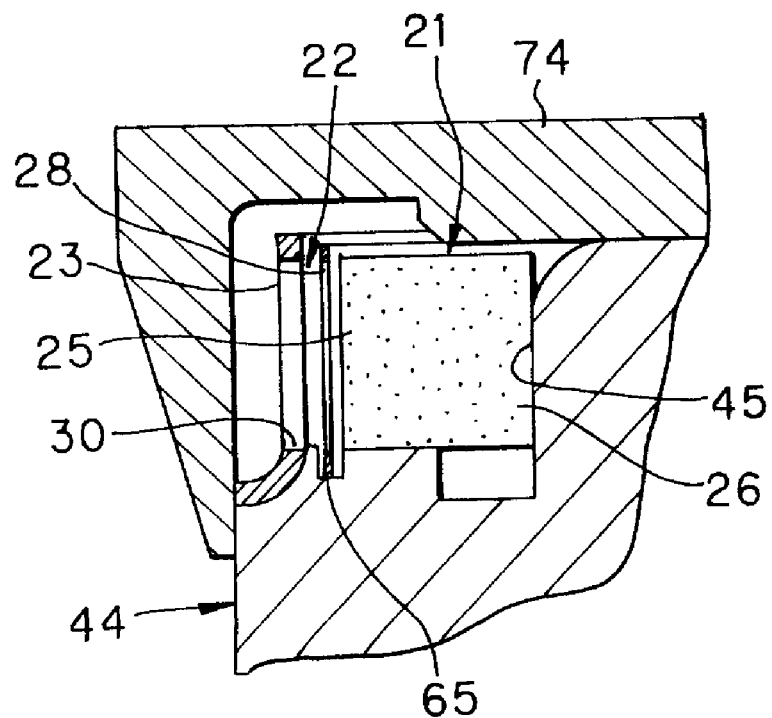

Next, as shown in FIGS. 9A and 9B, the outer-retainer fitting section 70 causes the cap 74 and the rotation center 76 to be lowered, sets the sprag pockets 45 of the boss 44 in a closed state by the cap 74 at a predetermined interval from the outer peripheral surface of the boss 44, and centers the center position of the cap 74 by means of the rotation center 76.

As for the cap 74, a dimension L between inner peripheral wall portions is formed to be slightly larger than the diameter of a virtual circumcircle of each of the sprags 21 inserted and fitted in the sprag inserting windows 30 of the outer retainer 23. The cap 74 is press-fitted over the boss 44 due to the lowering of the rotation center 76 in such a manner as to cover the upper portion of the boss 44 with the ribbon spring 23 fitted therearound.

This cap 74 is rotatable with respect to the rotation center 76. When the cap 74 is fitted over the upper portion of the boss 44, the inner surface of the cap 74 is made to abut against the upper surface of the boss 44, and an engaging pin 74a provided projectingly on the inner surface of the cap 74 is fitted in an engaging groove 44b formed in the upper surface of the boss 44. As a result, when the boss 44 is rotated continuously, the cap 74 rotates in interlocking relation to the boss 44, thereby making it possible to positively prevent the lifting up of the ribbon spring 22, the outer retainer 23, and the sprags 21 accompanying the continuous rotation of the boss 44 as well as a phase offset of the outer retainer 23.

Figure 10A:
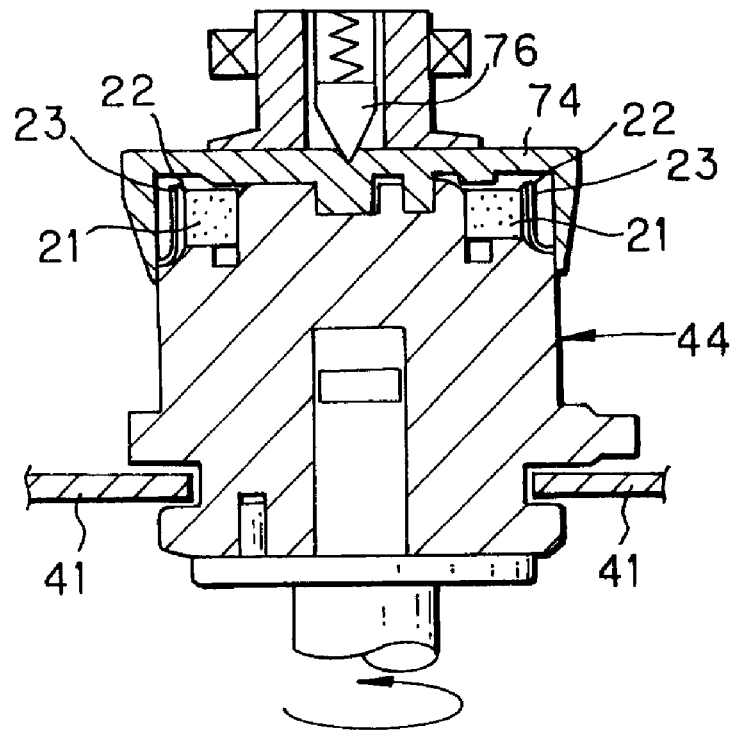
FIGS. 10A and 10B are cross-sectional views of essential portions of the outer-retainer fitting section of the one-way clutch manufacturing apparatus, for explaining the movement of the sprags.
Figure 10B:
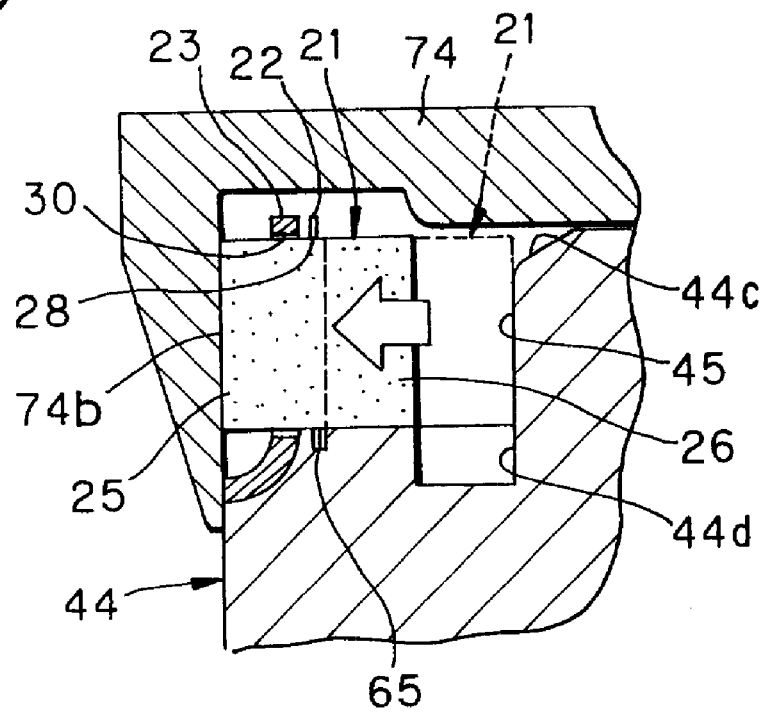
Figure 11:
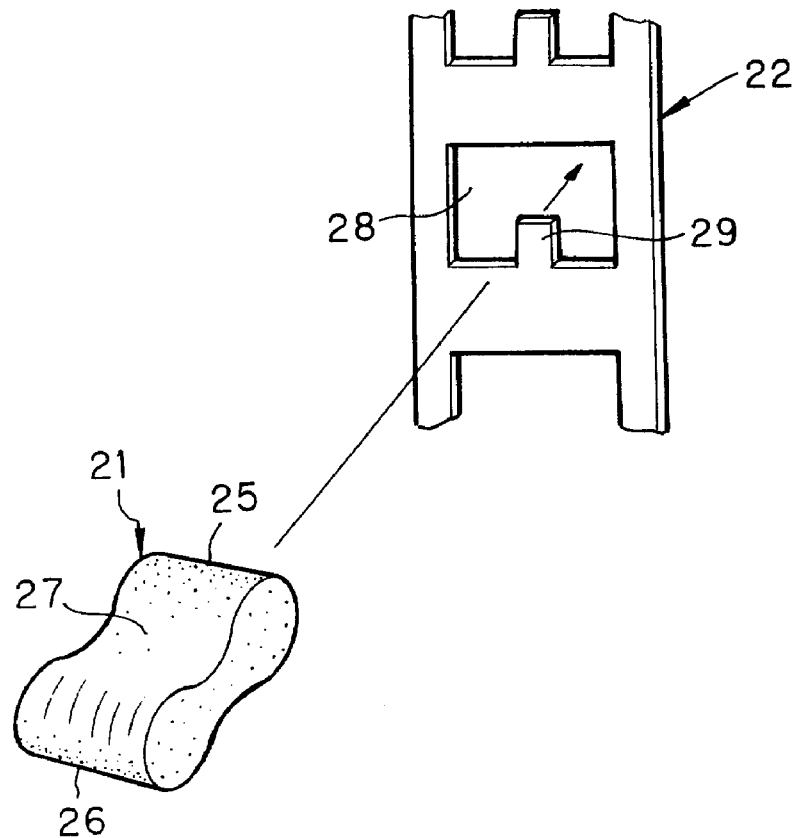
FIG. 11 is an enlarged perspective view illustrating a sprag inserting window of a ribbon spring and the sprag.

Then, upon receiving a signal representative of completion of the lowering of the cap 74 and the rotation center 76, which is detected by a sensor (not shown), the controller 42 starts a timer. Then, on the basis of a rotation-time command signal from the timer, the controller 42 causes the boss 44 to rotate continuously, as shown in FIGS. 10A and 10B, until a predetermined set time elapses. In this embodiment, this continuous operation is effected at a speed of 2,000 to 3,000 rpm by the servo motor 71. Incidentally, the rotation of the boss 44 at this time is controlled by an encoder 77 for detecting the rotation of the servo motor 71 and a differential counter 78.

As a result, a centrifugal force acts in the sprags 21 due to the continuous rotation of the boss 44, so that the sprags 21 press the tabs 29 (see FIG. 11) of the ribbon spring 22 from inside the sprag pockets 45, and are automatically inserted and fitted in the sprag inserting windows 28 of the ribbon spring 22 and the sprag inserting windows 30 of the outer retainer 23, respectively. At this time, the sprags 21 move toward the radially outer side of the boss 44 until they abut against an inner wall surface 74b of the cap 74, as shown in FIG. 10B. That is, the inner wall surface 74b of the cap 74 serves as a stopper for the sprags 21.

Figure 12:
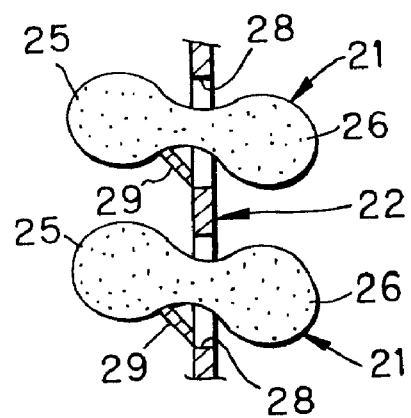
FIG. 12 is a cross-sectional view illustrating a state in which the sprags are inserted and fitted in the sprag inserting windows of the ribbon spring shown in FIG. 10.

Here, when the sprags 21 are inserted and fitted in the sprag inserting windows 28 of the ribbon spring 22 by means of the centrifugal force accompanying the continuous rotation of the boss 44, the tab 29 provided in each sprag inserting window 28 engages the recessed portion 27 formed at a substantially intermediate portion of the sprag 21 between the outer ring-side end portion 25 and the inner ring-side end portion 26, and the tab 29 is thereby resiliently deformed by a predetermined amount, as shown in FIG. 12. As a result, each sprag 21 is prevented from slipping off the ribbon spring 22 (snap-fit structure).

After the lapse of the time set by the timer, upon receiving a signal representative of completion of the raising of the cap 74 and the rotation center 76 detected by the sensor (not shown), the controller 42 causes the rotary index table 41 to turn through the predetermined angle θ.

Consequently, in the state in which the sprags 21 have been inserted and fitted in the sprag inserting windows 28 of the outer retainer 23 and the sprag inserting windows 30 of the ribbon spring 22, the boss 44 is moved to the inner-retainer fitting section 80.

Figure 13:
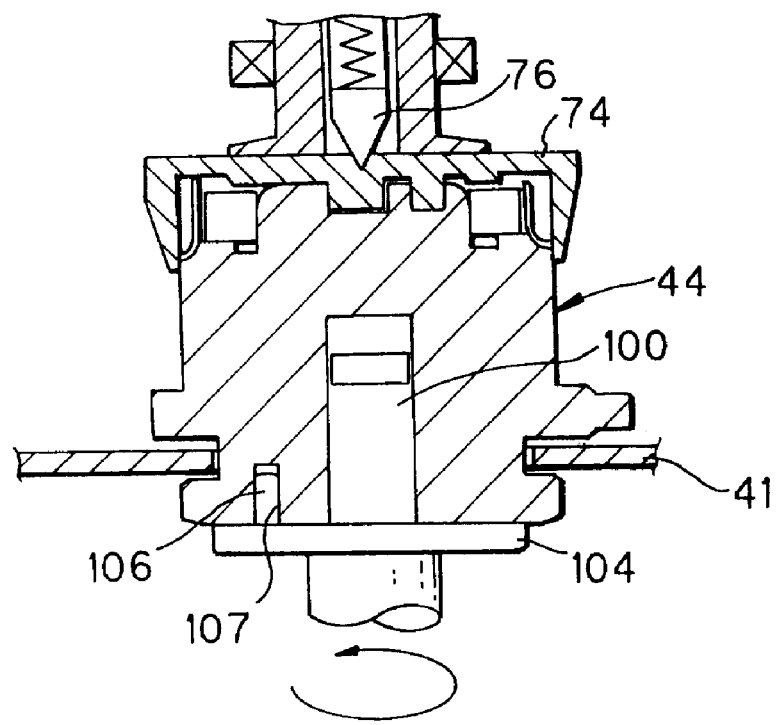
FIG. 13 a cross-sectional view illustrating the states of the rotary index table, the boss, and the servo motor shaft during the continuous rotation of the boss in the outer-retainer fitting section of the one-way clutch manufacturing apparatus.

Here, when the boss 44 is continuously rotated, the rotary index table 41, the boss 44, and the servo motor shaft 100 are in the states shown in FIG. 13.

Figure 14:
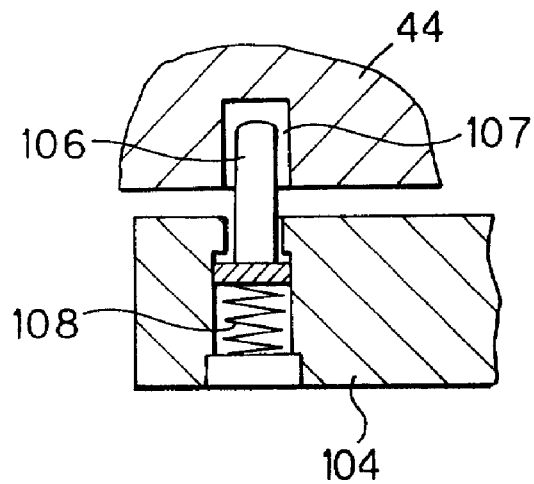
FIG. 14 is a partial enlarged cross-sectional view of the boss and a plate and a retaining pin of the servo motor shaft.

Namely, immediately before the boss 44 is continuously rotated, the servo motor shaft 100 rises slightly while rotating. Then, as shown in FIG. 14, the position of a retaining pin 106 provided on the plate 104 of the servo motor shaft 100 coincides with the position of a retaining-pin fitting groove 107 formed on a lower end surface of the boss 44. The retaining pin 106 projects upwardly in FIG. 14 from an upper surface of the plate 104 fixed to the servo motor shaft 100 by means of an urging force of a spring member 108, and is fitted in the retaining-pin fitting groove 107 in the boss 44.

At this time, as shown in FIG. 13, the boss 44 is lifted up by a predetermined amount by the servo motor shaft 100 and the plate 104, and is set in a state of being spaced apart from the rotary index table 41. As a result, the boss 44 starts to rotate in interlocking relation to the servo motor shaft 100 through the retaining pin 106.

Through the above-described third step, the boss 44 with the ribbon spring 22 fitted therearound is moved to the position of the outer-retainer fitting section 70 as the rotary index table 41 turns. Then, in the state in which the circumferential position of the sprag pockets 45 in the boss 44 is in phase with the circumferential position of the sprag inserting windows 30, the outer retainer 23 is fitted to the outer side of the ribbon spring 22 on the boss 44 by the outer-retainer fitting section 70. In this state, as the boss 44 is continuously rotated by the servo motor 71, the sprags 21 in the sprag pockets 45 move toward the radially outward side of the boss 44 owing to the centrifugal force, and inserted and fitted in the sprag inserting windows 28 of the ribbon spring 22 and the sprag inserting windows 30 of the outer retainer 23, respectively. This step is an outer-retainer fitting step.

Next, referring to FIGS. 1, 3, and 15 to 18, a description will be given of the fourth step.

The inner-retainer fitting section 80 is provided at one position on the outer peripheral portion of the rotary index table 41, the position being at the predetermined angle θ from the outer-retainer fitting section 70 of the third step (in FIG. 1 at the position in which the inner-retainer fitting section 80 is rotated 60° clockwise from the outer-retainer fitting section 70). The inner-retainer fitting section 80 is comprised of the boss 44, the servo motor 81 for rotatively driving the boss 44, an inner retainer magazine 82 for supplying inner retainers 24, an inner retainer loader (not shown) for moving the inner retainer 24 to the position of the boss 44, and a position sensor 84 for detecting the sprag windows of the inner retainer 24.

The inner-retainer fitting section 80 inserts the inner retainer 24 into the boss 44 in the state in which the circumferential position of the sprag inserting windows 31 of the inner retainer 24 accommodated in the inner retainer magazine 82 is in phase with the circumferential position of the sprag pockets 45 in the boss 44. Then, the inner retainer 24 is fitted into the inner peripheral-side of the ribbon spring 22 while the inner retainer 24 is relatively rotated with respect to the outer retainer 23 by the servo motor 81. Further, the relative rotation is stopped, the sprags 21 are respectively inserted and fitted in the sprag inserting windows 31 of the inner retainer 24 by moving the sprags 21 inside by means of the springs 29 shown in FIG. 11.

On the basis of a signal from the sprag-window detecting sensor 84 (a reflection-type projection-reception sensor), the inner retainer magazine 82 accommodating the inner retainers 24 adjusts the circumferential position of the sprag inserting windows 31 such that the circumferential position of the sprag inserting windows 31 will be in phase with the circumferential position of the sprag pockets 45 in the boss 44.

Figure 15:
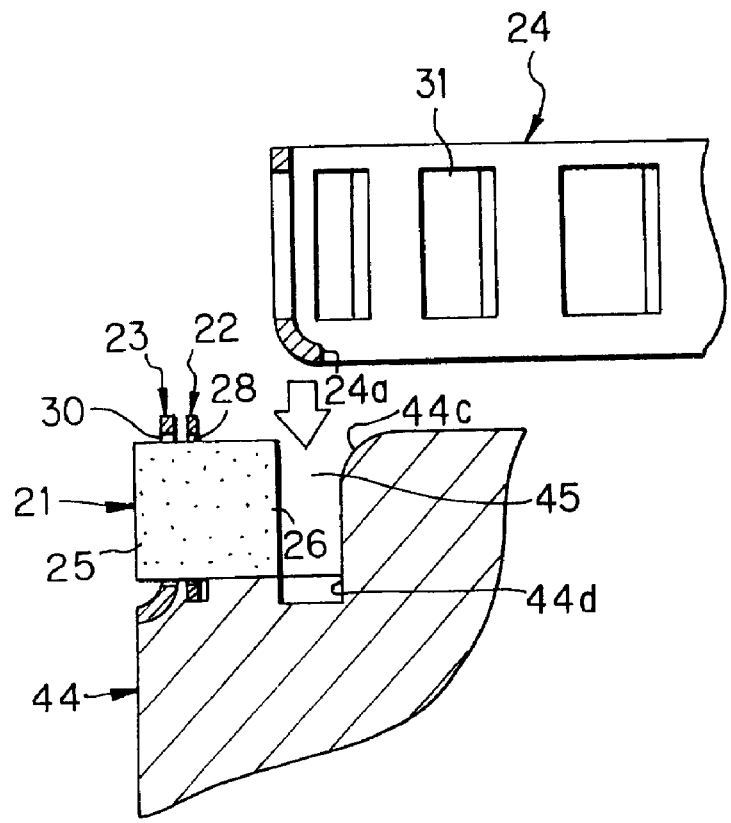
FIG. 15 is a cross-sectional view of essential portions illustrating a state prior to the fitting of an inner retainer by an inner-retainer fitting section of the one-way clutch manufacturing apparatus.
Figure 16:
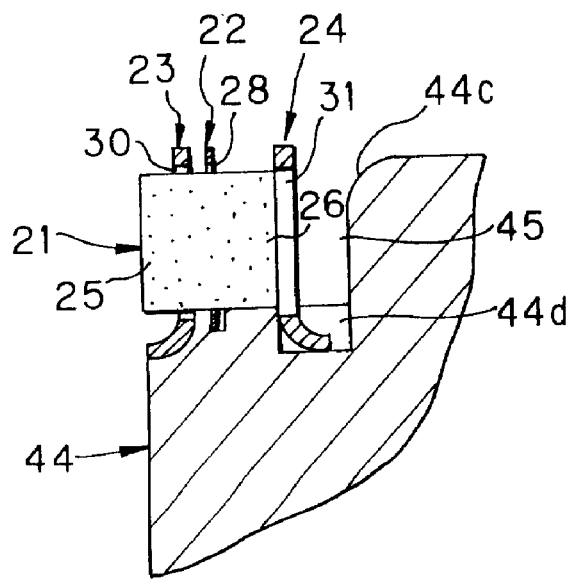
FIG. 16 is a cross-sectional view of essential portions illustrating a state after the fitting of the inner retainer by the inner-retainer fitting section of the one-way clutch manufacturing apparatus.

The inner retainer loader takes out the phase-adjusted inner retainer 24 from the inner retainer magazine 82, and advances the inner retainer 24 toward the rotary index table 41 side up to the position immediately above the boss 44 where the center of the inner retainer 24 is aligned with the center of the boss 44, as shown in FIG. 15. Then, as shown in FIG. 16, the inner retainer loader places the inner retainer 24 on the inner side of the ribbon spring 22 on the boss 44. At this time, a lower end portion 24a of the inner retainer 24 is loosely inserted in an inner-retainer guide groove 44d while being guided by a curved surface 44c for guiding an inner retainer formed on the boss 44. Subsequently, the inner retainer loader retracts to its initial position.

Upon receiving a signal representative of completion of the retraction of the inner retainer loader to its initial position detected by a sensor (not shown), the controller 42 causes a rotation restricting mechanism (not shown) to operate to restrict the rotation of the inner retainer 24, thereby setting the inner retainer 24 in a state in which the inner retainer 24 is not interlocked with the rotation of the boss 44. In this state, the controller 42 rotates the servo motor 81 at a fixed rotational torque set in advance, and detects the rotational torque of the servo motor 81 on the basis of a signal from a tacho-generator 85 attached to the servo motor 81. On the basis of this rotational torque, a determination is made as to whether or not the inner retainer 24 has been fitted properly.

Figure 17A:
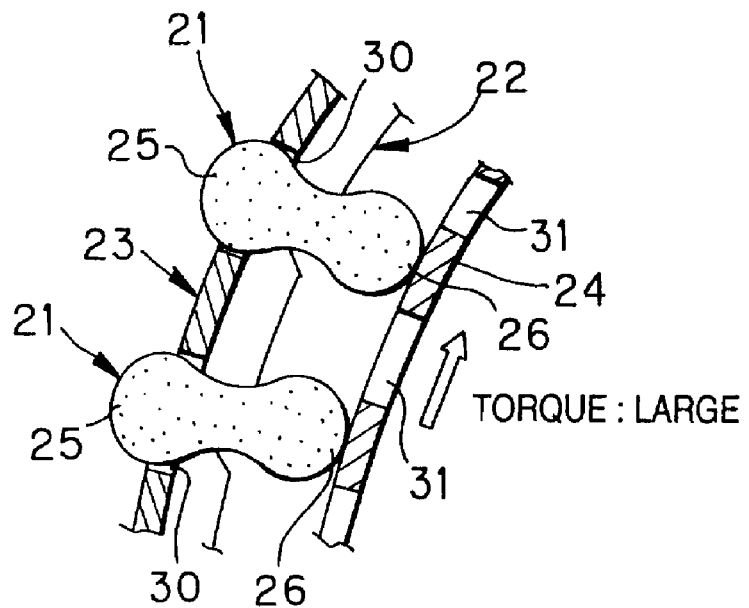
FIGS. 17A and 17B are cross-sectional views of essential portions illustrating a state in which the sprags are inserted and fitted into the sprag inserting windows of the inner retainer in the inner-retainer fitting section of the one-way clutch manufacturing apparatus.

Here, a detailed description will be given of the rotational torque of the servo motor 81. As shown in FIG. 17A, in the state in which the inner retainer 24 abuts against the inner ring-side end portions 26 of the sprags 21, and the sprags 21 are not inserted and fitted in the sprag inserting windows 31 of the inner retainer 24, the sliding friction between the inner ring-side end portions 26 of the sprags 21 and the inner retainer 24 is large, and a rotational torque exceeding a minimum value Tmin of the rotational torque set in advance is detected.

Figure 17B:
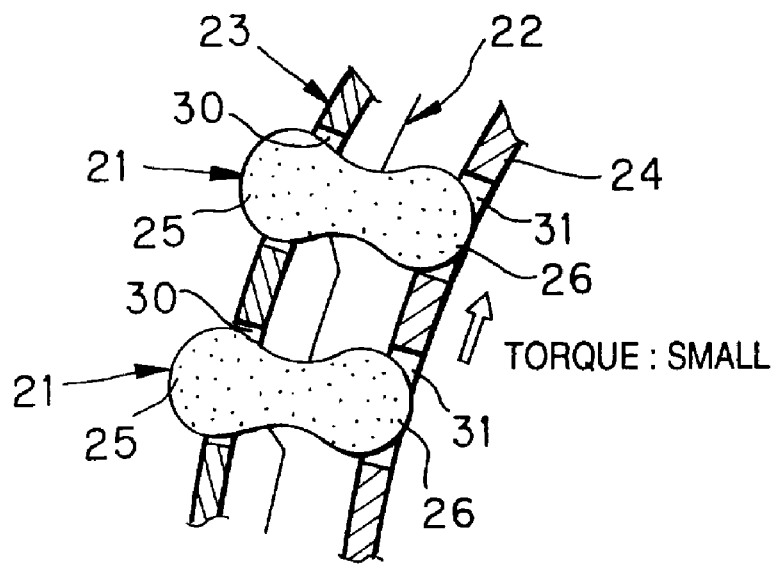

Meanwhile, as shown in FIG. 17B, the moment when the inner ring-side end portions 26 of the sprags 21 are inserted and fitted in the sprag inserting windows 31 of the inner retainer 24, the sprags 21 are set in a slightly free state in the circumferential direction inside the sprag inserting windows 31 of the inner retainer 24, and a rotational torque lower than the minimum value Tmin of the rotational torque set in advance is detected.

Accordingly, by making use of a change in the aforementioned rotational torque, detection is made as to whether or not the sprags 21 have been inserted into the sprag inserting windows 31 of the inner retainer 24. In addition, prior to this detection, detection is made as to whether or not the inner retainer 24 has been properly inserted in the boss 44.

Namely, the controller 42 detects the insertion and fitting of the sprags 21 into the sprag inserting windows 31 of the inner retainer 24 by detecting the initial rotational torque of the inner retainer 24 whose rotation is restricted as well as a decline in the rotational torque at the moment when the sprags 21 are inserted and fitted into the sprag inserting windows 31 (the state shown in FIG. 17B).

Figure 18:
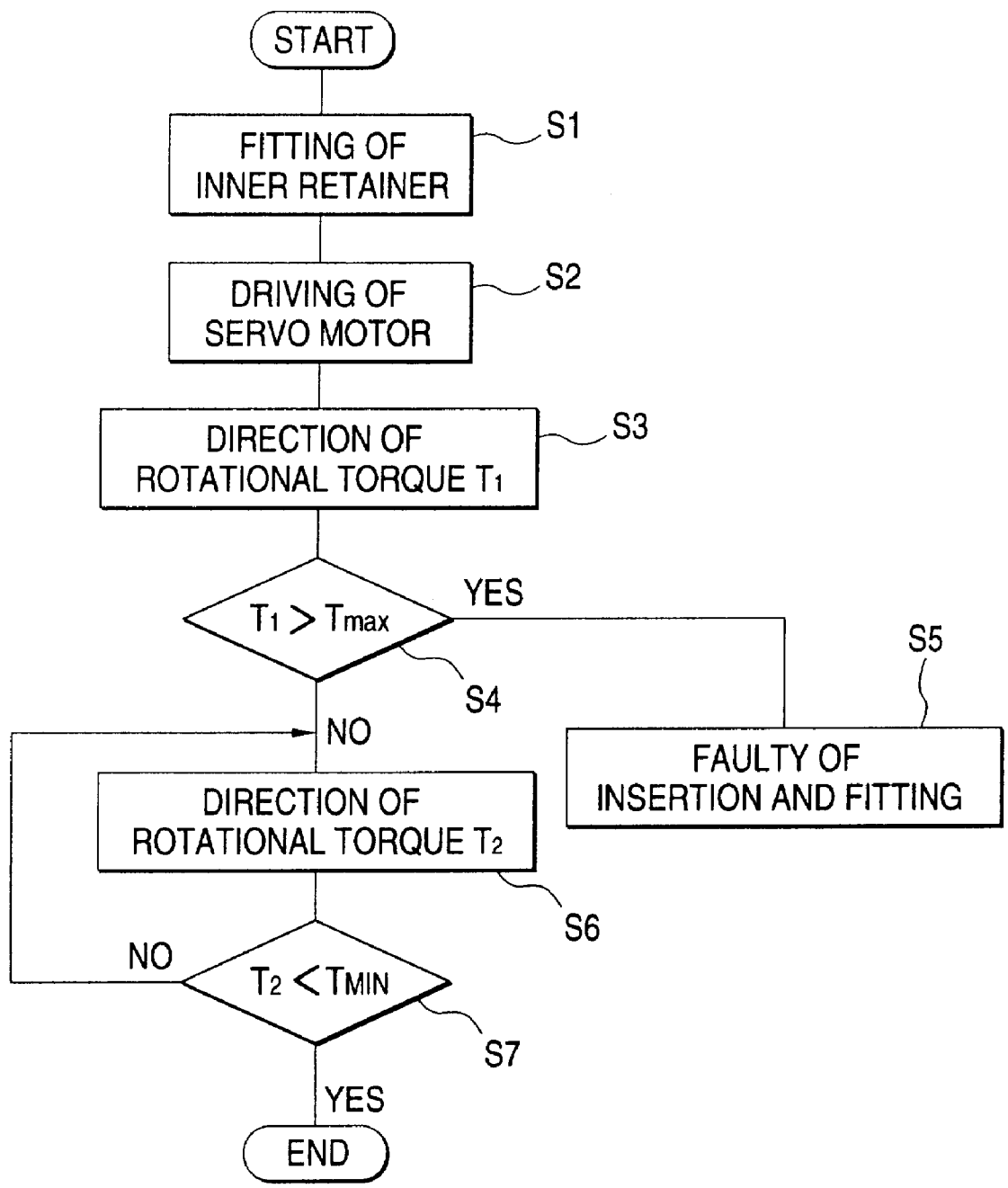
FIG. 18 is a flowchart for control in the inner-retainer fitting section of the one-way clutch manufacturing apparatus.

Hereafter, referring to the control flowchart shown in FIG. 18, a description will be given of the procedure for fitting the inner retainer 24 by the inner-retainer fitting section 80.

In Step 1 (hereafter abbreviated as S1), the inner retainer loader is operated, and the inner retainer 24 is fitted to the boss 44 from the inner retainer magazine 82. In S2, the servo motor 81 is rotatively driven at a fixed rotational torque set in advance. Then, in S3, as shown in FIG. 3, a rotational torque T1 of the servo motor 81 is detected by a current value from the tacho-generator 85 for detecting the number of revolutions of the servo motor 81. In addition, the current value from the tacho-generator 85 is inputted to an upper-limit current-value differential counter 86.

In S4, a comparison is made between the upper limit current value, which has been inputted in advance to the controller 42 as a signal representative of an upper limit current setting, and the current value inputted from the tacho-generator 85 to the upper-limit current-value differential counter 86 and corresponding to the rotational torque T1. With this comparison, a determination is made as to whether or not the detected rotational torque T1 is greater than the maximum value Tmax of the rotational torque corresponding to the upper limit current value.

In S4, if it is determined that the detected rotational torque T1 is greater than the maximum value Tmax, the operation proceeds to S5 in which a decision is made that the insertion and fitting of the inner retainer 24 into the boss 44 is faulty. Namely, in this case, it is possible to cite, for example, a case in which the inner retainer 24 is inserted in an inclined manner.

Meanwhile, in S4, it it is determined that the detected rotational torque T1 is smaller than the maximum value Tmax, it is assumed that the inner retainer 24 has been inserted properly into the boss 44, and the operation proceeds to S6. In S6, a rotational torque T2 of the servo motor 81 is detected again on the basis of the current value inputted to a lower-limit current-value differential counter 87 from the tacho-generator 85.

Then, in S7, a comparison is made between the lower limit current value, which has been inputted in advance to the controller 42 as a signal representative of a lower limit current setting, and the current value inputted from the tacho-generator 85 to the lower-limit current-value differential counter 87 and corresponding to the rotational torque T2. With this comparison, a determination is made as to whether or not the detected rotational torque T2 is smaller than the minimum value Tmin of the rotational torque corresponding to the lower limit current value.

In S7, if it is determined that the detected rotational torque T2 is smaller than the minimum value Tmin, it is assumed that the sprags 21 have been inserted and fitted into the sprag inserting windows 31 of the inner retainer 24, so that the boss 44, to which the inner retainer 24 has been fitted by the inner-retainer fitting section 80, is moved to the unloader section 90 by turning the rotary index table 41.

On the other hand, if it is determined in S7 that the detected rotational torque T2 is greater than the minimum value Tmin, the operation returns to S6, and the boss 44 is rotatively driven until the condition of S7 is met.

Through the above-described fourth step, the inner retainer 24 in which the phase of the sprag inserting windows 31 adjusted to the phase of the sprag pockets 45 of the boss 44 is fitted to the inner side of the ribbon spring 22 on the boss 44. In this state, the inner retainer 24 is relatively rotated with respect to the outer retainer 23 and the ribbon spring 22, thereby allowing the inner ring-side end portions 26 of the sprags 21 to be inserted and fitted in the sprag inserting windows 31 of the inner retainer 24. This step is an inner-retainer fitting step.

Next, referring to FIG. 1, a description will be given of the fifth step.

The unloader section 90 is provided at one position on the outer peripheral portion of the rotary index table 41, the position being at the predetermined angle θ from the inner-retainer fitting section 80 (in FIG. 1 at the position in which the unloader section 90 is rotated 60° clockwise from the inner-retainer fitting section 80). The unloader section 90 is comprised of the boss 44 and an index unloader 91 for removing the one-way clutch 20 from the boss 44.

In the unloader section 90, the index unloader 91 removes the assembled one-way clutch 20 from the boss 44 and carries it out.

Namely, the boss 44 to which the inner retainer 24 has been fitted is moved to the position of the unloader section 90 by turning the rotary index table 41, and the assembled one-way clutch 20 is removed from the boss 44 and carried it out by the index unloader 91. This step is an unloading step.

The boss 44 from which the one-way clutch 20 has been removed is returned to the position a via the position f by turning the rotary index table 41. Then, the above-described first step is resumed at the position a.

As described above, in accordance with this embodiment, the operation of assembling the one-way clutch 20 can be automated without applying undue forces to the respective component parts and without using a complicated assembling apparatus, and it is possible to improve the productivity and stability in the quality of the one-way clutches 20 and attain labor saving.

In accordance with the present invention, by using a boss which is formed in a substantially hollow cylindrical shape and in which sprag pockets which are open toward a radially outward side in such a manner as to be capable of accommodating the sprags and V-shaped grooves for respectively engaging V-shaped bent portions of the ribbon spring are disposed alternately in an outer peripheral portion thereof, the sprags are consecutively inserted into the sprag pockets of the boss; the ribbon spring is wound around an outer periphery of the boss while the V-shaped bent portions of the ribbon spring are being respectively engaged in the V-shaped grooves of the boss; the boss is continuously rotated at a predetermined number of revolutions after the outer retainer, for which a phase of the sprag inserting windows of the outer retainer is adjusted to a phase of the sprag pockets of the boss, is fitted to an outer peripheral side of the ribbon spring on the boss, thereby allowing the sprags to move from inside the sprag pockets toward the radially outward side of the boss and to be inserted and fitted into the sprag inserting windows of the ribbon spring and the outer retainer, respectively, by a centrifugal force; and the inner retainer, for which a phase of the sprag inserting windows of the inner retainer is adjusted to the phase of the sprag pockets of the boss, is fitted to an inner side of the ribbon on the boss while relatively rotating the inner retainer with respect to the ribbon spring, so as to insert the sprags into the sprag inserting windows of the inner retainer. Accordingly, it is possible to automate the operation of assembling one-way clutches without relying on the manual operation requiring expert skill and without using a complex apparatus, and it is possible to substantially improve the productivity and stability in the quality of one-way clutches. In addition, labor saving can be attained.

The present invention relates to the subject matter contained in Japanese patent application No. Hei. 10-135535 filed on May 18, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. A method of manufacturing a one-way clutch, said one-way clutch including: a plurality of sprags; a flexible ribbon spring having first sprag inserting windows in a longitudinal direction thereof, for inserting said sprags therein; an outer retainer disposed on an outer peripheral-side of said flexible ribbon spring and having second sprag inserting windows in which outer peripheral-side end portions of the sprags can be inserted; and an inner retainer dispensed on an inner peripheral-side of said flexible ribbon spring and having third sprag inserting windows in which inner peripheral-side end portions of said sprags can be inserted, said method comprising the steps of:

providing a boss which is formed in a substantially column shape and in which sprag pockets which are open toward a radially outward side in such a manner as to accommodate said sprags and substantially V-shaped grooves for respectively engaging V-shaped bent portions of said ribbon spring are disposed alternately in an outer peripheral portion of the radial direction thereof;

consecutively inserting said sprags into said sprag pockets of said boss;

winding said ribbon spring around said outer peripheral portion of said boss while said V-shaped bent portions of said ribbon spring are respectively engaged in said V-shaped grooves of said boss;

fitting said outer retainer, for which a phase of the second sprag inserting windows of said outer retainer is adjusted to a phase of said sprag pockets of said boss, to the outer peripheral side of said ribbon spring wound on said boss; and continuously rotating said boss at a predetermined number of revolutions so that said sprags are moved from inside said sprag pockets toward the radially outward side of said boss and are inserted and fitted into said first and second sprag inserting windows of said ribbon spring and said outer retainer, respectively, by a centrifugal force, whereby said sprags are integrally assembled with said outer retainer and said ribbon spring.

2. A method of manufacturing a one-way clutch according to claim 1, further comprising the steps of:

fitting said inner retainer, for which a phase of said third sprag inserting windows of said inner retainer is adjusted to the phase of said sprag pockets of said boss, to the inner peripheral-side of the ribbon spring disposed on said boss while relatively rotating said inner retainer with respect to said ribbon spring; and stopping the relative rotation of said inner retainer so as to insert said sprags into said third sprag inserting windows of said inner retainer.

* * * * *